United States Patent
Pan et al.

(10) Patent No.: US 9,723,851 B2
(45) Date of Patent: Aug. 8, 2017

(54) INFRARED DRY BLANCHING, INFRARED BLANCHING AND INFRARED DRYING TECHNOLOGIES FOR FOOD PROCESSING

(71) Applicant: The United States of America as Represented by the Secretary of the Department of Agriculture, Washington, DC (US)

(72) Inventors: Zhongli Pan, Davis, CA (US); Tara H. McHugh, El Cerrito, CA (US)

(73) Assignee: The United States of America as Represented by the Secretary of the Department of Agriculture, Washington, DC (US)

( * ) Notice: Subject to any disclaimer, the term of this patent is extended or adjusted under 35 U.S.C. 154(b) by 0 days.

(21) Appl. No.: 14/244,448

(22) Filed: Apr. 3, 2014

(65) Prior Publication Data

US 2014/0287109 A1   Sep. 25, 2014

Related U.S. Application Data

(63) Continuation of application No. 10/917,797, filed on Aug. 13, 2004, now abandoned.

(51) Int. Cl.
*A23B 7/01* (2006.01)
*A23B 4/01* (2006.01)
(Continued)

(52) U.S. Cl.
CPC .................. *A23B 7/01* (2013.01); *A23B 4/01* (2013.01); *A23B 4/031* (2013.01); *A23B 7/02* (2013.01);
(Continued)

(58) Field of Classification Search
CPC .... A23B 7/01; A23B 7/02; A23B 7/06; A23B 4/01; A23B 4/031; A23B 9/04; A23N 12/06; Y02P 60/853
(Continued)

(56) References Cited

U.S. PATENT DOCUMENTS 3,006,773 A  10/1961  Fitzgerald
3,063,848 A  11/1962  Gelder
(Continued)

FOREIGN PATENT DOCUMENTS

EP        0582922 A1    2/1994

OTHER PUBLICATIONS

Macaluso, "Infrared Drying Technology Application," *Cereal Foods World*, pp. 355 (2001).
(Continued)

*Primary Examiner* — Steven Leff
(74) *Attorney, Agent, or Firm* — Kilpatrick Townsend & Stockton LLP

(57) ABSTRACT

This invention relates to food processing and, in particular, blanching and dehydration of foods. Conventional blanching and dehydration requires use of steam and forced hot air. This invention is the first to effectively use infrared radiation energy to perform simultaneous blanching and dehydration of fruits and vegetables. Since this technology does not involve the addition of steam or water in the process of blanching, it has been named "infrared dry-blanching" (IDB) technology. IDB is intended to be a replacement for current steam, water and/or microwave blanching methods. It can be used to produce many kinds of value-added dried, refrigerated, frozen and dehydrofrozen foods such as fruit and vegetable products. In general, the advantages of IDB include (1) uniform heating which enhances energy efficiency and limits damage from over-heating, (2) capability
(Continued)

of zone heating to address differential density, (3) ability to treat large or small lots with the same piece of equipment, (4) portability, since equipment can be built on wheels, and (5) a safe, non-toxic process with no harmful side-effects to humans or the environment.

7 Claims, 9 Drawing Sheets

(51) Int. Cl.
    *A23B 4/03*         (2006.01)
    *A23B 7/02*         (2006.01)
    *A23B 7/06*         (2006.01)
    *A23B 9/04*         (2006.01)
    *A23N 12/06*       (2006.01)

(52) U.S. Cl.
    CPC ................. *A23B 7/06* (2013.01); *A23B 9/04* (2013.01); *A23N 12/06* (2013.01); *Y02P 60/853* (2015.11)

(58) Field of Classification Search
    USPC .......................................... 426/237, 241–242
    See application file for complete search history.

(56) References Cited

U.S. PATENT DOCUMENTS

| | | | |
|---|---|---|---|
| 3,092,503 A | 6/1963 | Gray | |
| 3,910,175 A | 10/1975 | Smith | |
| 4,612,200 A | 9/1986 | Sato | |
| 4,863,749 A | 9/1989 | Yamada | |
| 4,865,857 A | 9/1989 | Inagaki | |
| 5,128,163 A | 7/1992 | Theys et al. | |
| 5,397,584 A | 3/1995 | Aung et al. | |
| 5,472,721 A | 12/1995 | Eisenberg et al. | |
| 5,560,287 A | 10/1996 | Petelle et al. | |
| 5,603,973 A | 2/1997 | Benson et al. | |
| 5,747,087 A | 5/1998 | Fosbol et al. | |
| 5,955,130 A | 9/1999 | Gagliardi et al. | |
| 5,972,397 A | 10/1999 | Durance et al. | |
| 6,539,645 B2 | 4/2003 | Savarese | |
| 6,599,547 B1 | 7/2003 | Martinez-Serna Villagran et al. | |
| 6,706,298 B1 | 3/2004 | Villagran et al. | |
| 2002/0039612 A1 | 4/2002 | Gambino et al. | |

OTHER PUBLICATIONS

Mongraneet et al., "Accelerated drying of welsh onion by far infrared radiation under vacuum conditions", *J. of Food Engineering*, vol. 55, pp. 147-156
Paakkonen et al., "Infrared drying of herbs", *Agricultural and Food Science in Finland*, vol. 8, pp. 19-27 (1999).
Seyed-Yagoobi et al., "An Experimental Study of Gas-Fired Infrared Drying of Paper", *Drying Technology*, vol. 19, No. 6, pp. 1099-1112 (2001).
Umesh Hebbar et al., "Mass transfer during infrared drying of cashew kernel", *J. of Food Engineering*, vol. 47, pp. 1-5 (2001).
Wang et al, "A Single-Layer Model for Far-Infrared Radiation Drying of Onion Slices", *Drying Technology*, vol. 20, No. 10, pp. 1941-1853 (2002).
Final Office Action issued on Apr. 23, 2012 for U.S. Appl. No. 12/370,310, 12 pages.
Non-final Office Action issued on Oct. 11, 2011 for U.S. Appl. No. 12/370,310, 9 pages.
Final Office Action issued on Feb. 14, 2011 for U.S. Appl. No. 10/917,797, 12 pages.
Non-Final Office Action issued on Aug. 25, 2010 for U.S. Appl. No. 10/917,797, 10 pages.
Final Office Action issued Apr. 6, 2010 for U.S. Appl. No. 10/917,797, 10 pages.
Non-Final office Action issued on Sep. 10, 2009 for U.S. Appl. No. 10/917,797, 13 pages.
Final Office Action issued on Sep. 15, 2008 for U.S. Appl. No. 10/917,797, 9 pages.
Non-Final office Action issued on Feb. 13, 2008 for U.S. Appl. No. 10/917,797, 8 pages.
International Search Report in PCT/US2005/028502, dated Nov. 2, 2006.
Ponne et al., "Blanching Leafy Vegetables with Electromagnetic Energy," *Journal of Food Science* 59(5):1037-1041 (1994).

INFRARED DRY BLANCHING, INFRARED BLANCHING AND INFRARED DRYING TECHNOLOGIES FOR FOOD PROCESSING

BACKGROUND OF THE INVENTION

Field of the Invention

The present invention relates to the processing, preparation, and preserving of food.

Description of the Art

In 2002, the average American consumed 284.4 pounds of fruit, 65% of which was processed. In fact, forty four percent of the vegetables produced in the United States are processed in some way. For most fruits and vegetables, "processing" includes blanching which is a procedure used to inactivate the enzymes responsible for quality deterioration of fruits and vegetables. This inactivation is normally achieved by exposing fruits and vegetables to an elevated temperature (70-100° C.) for a period of time (generally 1-10 minutes). Typical energy sources include hot water, steam or microwave.

Besides the inactivation of enzymes, blanching also operates to reduce microbial contamination, to stabilize color, and to facilitate further processing and handling.

Blanching has generally been done utilizing hot water or steam. This requires a large amount of energy, however, and can cause significant losses of nutrients, phytochemicals, and/or flavors. Moreover, hot water or steam blanching can also result in aesthetic deterioration of fruits and vegetables, making them less appealing to consumers.

Since blanching with hot water or steam at high temperature may cause undesirable changes in product texture, low temperature blanching at 50-70° C. has been attempted with various fruits and vegetables, including carrots, bell peppers, and sweet potatoes (Dominguez et al., 1996; Fuchigami et al., 1995; Stanley et al., 1995). In general, low temperature blanching was found to improve the texture quality of the products, but suffered from the shortcoming of longer processing times.

High pressure blanching has also been studied as a possible alternative to steam blanching. For example, pressures of between 400 to 900 MPa, applied for 5-10 min, have been shown to inactivate up to 88% of peroxidase in green peas. (Guaglia et al., 1996; Master et al., 2000). However, high pressure blanching significantly reduces the firmness of the treated samples, and the process itself requires expensive equipment which is also expensive to operate.

Although hot water and steam blanching is a common processing step for vegetables, alternatives have been sought especially for delicate fruit which are easily damaged. Various methods have been attempted such as chemical inactivation of enzymes, avoidance of contact with oxygen, and use of various antioxidants. Examples of alternative practices include dipping the fruit in diluted ascorbic or citric acid solution, or exposing them to sulfur gas before freezing, canning, or drying in order to prevent enzymatic browning (FMC, 2003; Dauthy, 1995). The shortcomings of these alternatives, however, include extended processing time, increased expense, and undesired flavors.

Some researchers have tried to use microwave energy to blanch fruits and vegetables. Microwave blanching, however, is a very expensive technology due to high capital cost and low energy efficiency. Additionally, microwave energy can also cause significant losses of nutrients and phytochemicals, as well as quality deterioration due to uneven heating inside the food products.

In short, blanching technologies to date all suffer from one or more shortcomings.

In addition to blanching, food processing also frequently includes dehydration or drying. In fact, dehydration is often performed after blanching and is itself the most energy consuming step in food and agricultural product processing.

Dehydration is typically achieved through the use of hot air, usually generated by gas-fired heaters and electrically driven blowers, directed through an air tunnel. This process suffers from relatively long drying times, high energy consumption, and unpredictable microbial counts in the finished products. Moreover, long drying times can cause significant losses of volatile compounds, reducing the desirable flavor characteristics of the finished products. Furthermore, most dryers and dehydrators are normally specialized for only one commodity, which increases operating costs and capital outlay. Finally, high drying temperature and high airflow rate also combine to cause deterioration in the quality of finished products. In the case of rice processing, for example, high temperature drying significantly reduces the amount of marketable product, which has a direct and adverse impact on the economic value of the paddy rice to both rice farmers and rice processors (Pan, 2003).

Other dehydration methods have also been tried. Solar drying, for example, is simple and economical, but the products are subject to insect and rodent attack, wind damage, sudden rain, soil entry and other problems. Drying can also be done with osmotic dehydration, immersion chilling, and freezing in concentrated aqueous solutions (Torreggiani et al., 2000). These methods all have significant adverse impact on the quality of the finished product or high production costs.

Food processing also frequently requires a freezing step. One approach that has been attempted is to combine blanching, dehydrating, and freezing. Such products are often referred to as "dehydrofrozen products."

The dehydrofreezing process offers several advantages over conventional freezing, including (1) energy savings due to lower water load to the freezer; (2) reduced costs related to transport, storage and wrapping; (3) better quality and stability (color and flavor); and (4) superior thawing properties (low drip loss). The moisture content of typical dehydrofrozen products is reduced 40-60% of the original content. These products also need to be processed quickly in order to mitigate the quality change caused by the blanching heat. Conventional convective drying, which is how these products are normally processed, is problematic because it requires a relatively long period which often results in product deterioration.

For the foregoing reasons, the food and agricultural processing industries have been seeking efficient and cost effective alternative blanching and drying technologies for producing high quality, more versatile products. One alternative that has shown great promise is the use of infrared technology.

The use of infrared technology in food processing, including the separate processes of blanching and dehydration, has been studied but has not been widely implemented because of problems involving lack of effective protocols as well as general reliability. Infrared heating is promising, however, because it can potentially shorten processing times, improve energy efficiency, reduce the space needed for equipment, and generally enhance production and quality.

What is needed is a method and apparatus that can employ effective infrared processing technology that can be used to blanch and dehydrate food in general, and dry fruits and vegetables in particular. The ideal system will provide the ability to perform blanching and dehydrating/drying separately or simultaneously. The inventors have been able to achieve just such a method and apparatus.

SUMMARY OF THE INVENTION

This invention is the first to effectively use infrared radiation energy to perform simultaneous blanching and dehydration of fruits and vegetables. Since this technology does not involve the addition of steam or water in the process of blanching, it has been named "infrared dry-blanching" (IDB) technology. IDB is intended to be a replacement for current steam, water and/or microwave blanching methods.

The invention works by using infrared radiation energy to heat-up food products, achieving blanching and dehydration in a single step. TDB also can be combined with heated air or vacuum to accelerate the drying process. Vacuum also enhances heat penetration, thus making the blanching process itself more effective. The vacuum should be in the range of 20-30 inches Hg. The combined infrared and vacuum process also improves the texture and appearance of the finished products. This invention can be used to produce many kinds of value-added dried, refrigerated, frozen and dehydrofrozen foods such as fruit and vegetable products.

In general, the advantages of IDB include (1) uniform heating which enhances energy efficiency and limits damage from over-heating, (2) capability of zone heating to address differential density, (3) ability to treat large or small lots with the same piece of equipment, (4) portability, since equipment can be built on wheels, and (5) a safe, non-toxic process with no harmful side-effects to humans or the environment.

IDB technology is inherently energy efficient due to the penetration capability of infrared and the elimination of the need for water or steam. The impact of IDB on energy expenditures is significant and something the food industry has been aggressively pursuing. This is not surprising since IDB can result in significant energy savings because infrared penetrates food materials without heating the surrounding air. Moreover, the initial capital cost of the infrared equipment needed for the IDB process is comparable to that for a conventional blanching and tunnel drying system Another advantage of the invention is that blanching and drying can be achieved in a single step rather than the two steps used at present. This results in simpler processing and saves time.

A major advantage of the invention is that products treated by IDB retain more nutrients, phytochemicals, and flavors compared to blanching conducted with steam or microwave energy.

Finally, IDB is a versatile technology that can also be used for dehydration and processing of other commodities such as grains, legumes, and meat.

Other advantages and benefits of IDB will become apparent in the disclosure below.

Please note that the sample holder can also be either a continuous belt or a rotatable drum.

Figure 4:
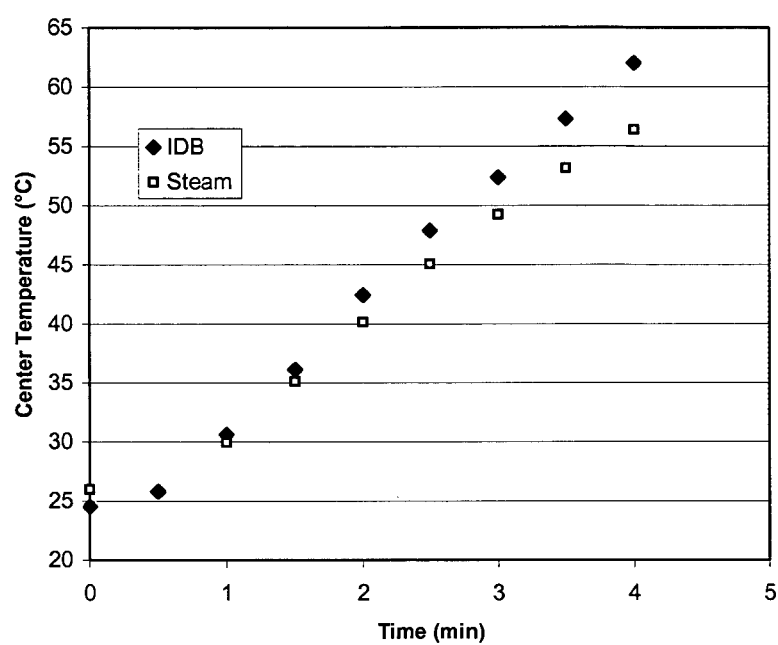

FIG. 4 shows the heating rates of pear slices by IDB and 75° C. steam blanching.

Figure 5:
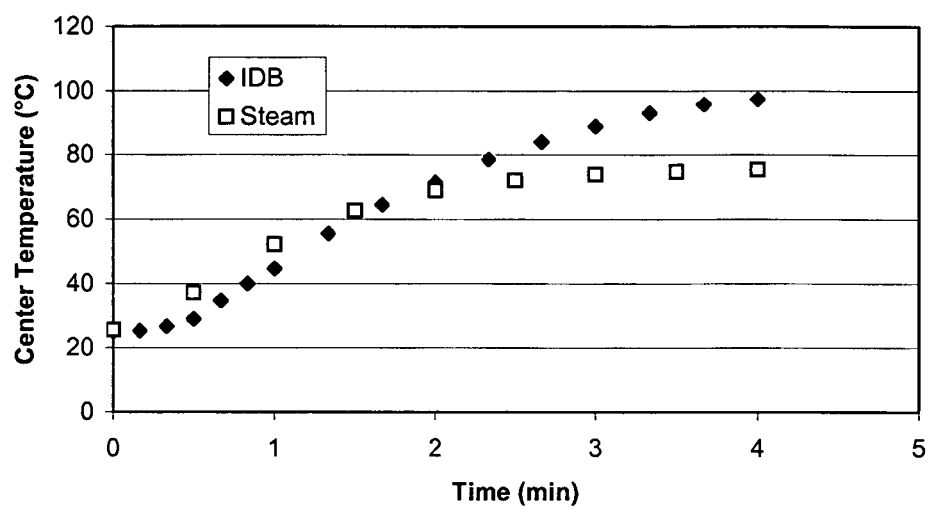

FIG. 5 shows the heating rates of pear cubes by IDB and 75° C. steam blanching.

Figure 6:
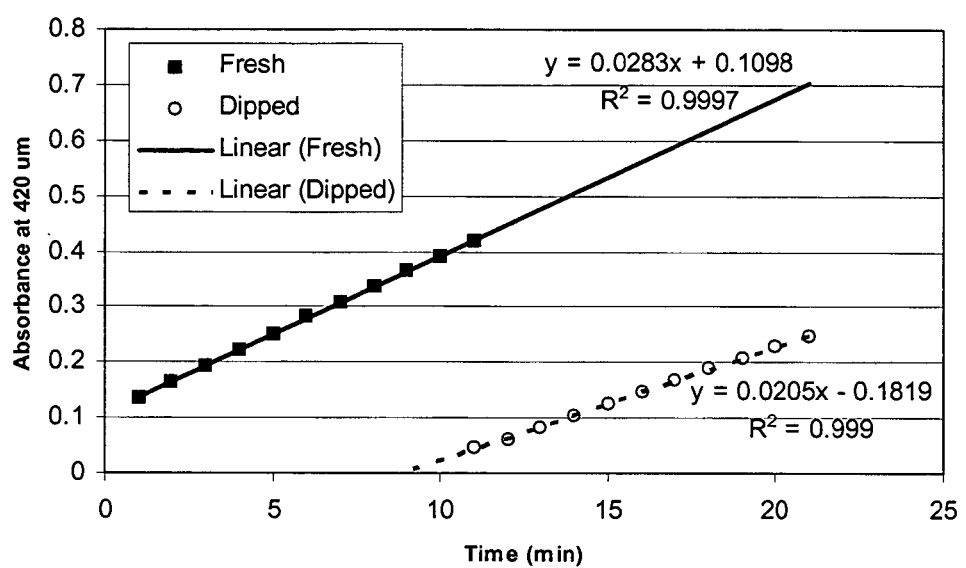

FIG. 6 shows peroxidase activity of pear samples.

Figure 7:
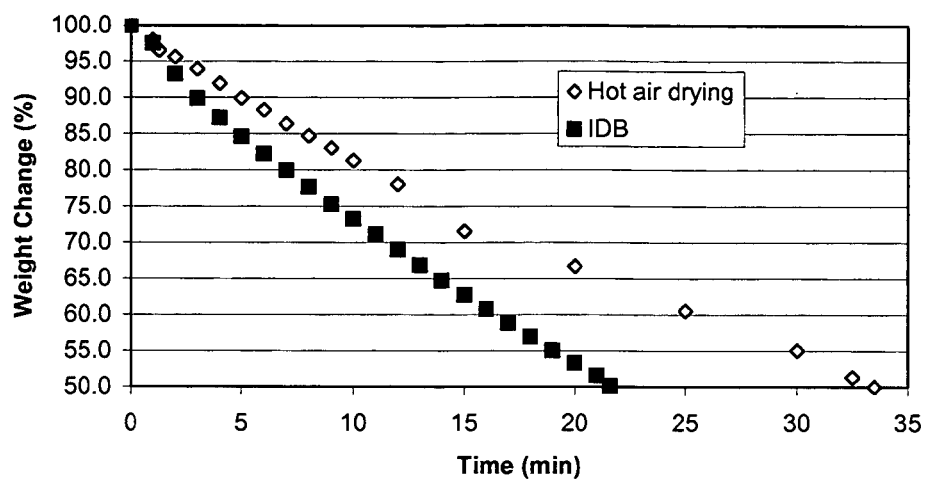

FIG. 7 shows weight change of pear samples with IDB and heated air drying.

Figure 8:
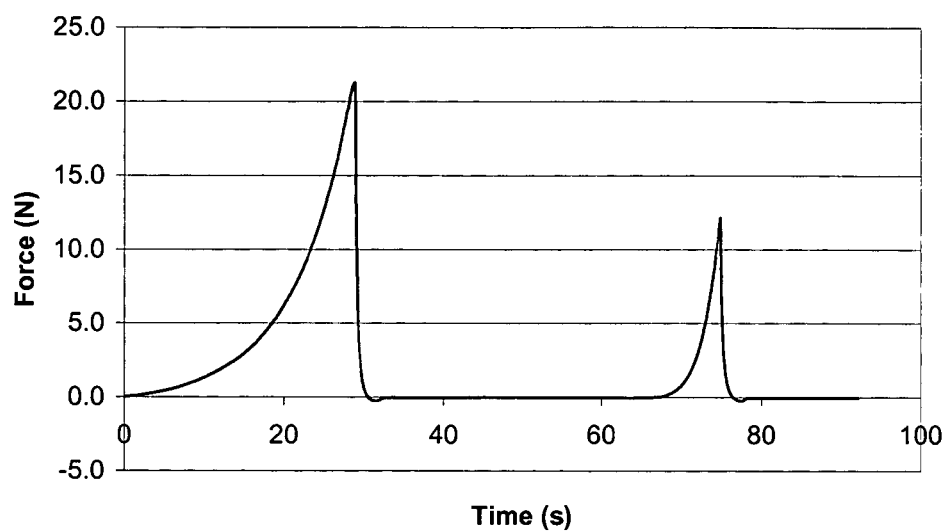

FIG. 8 shows a typical TPA texture profile of IDB and dehydrated pear.

Figure 9:
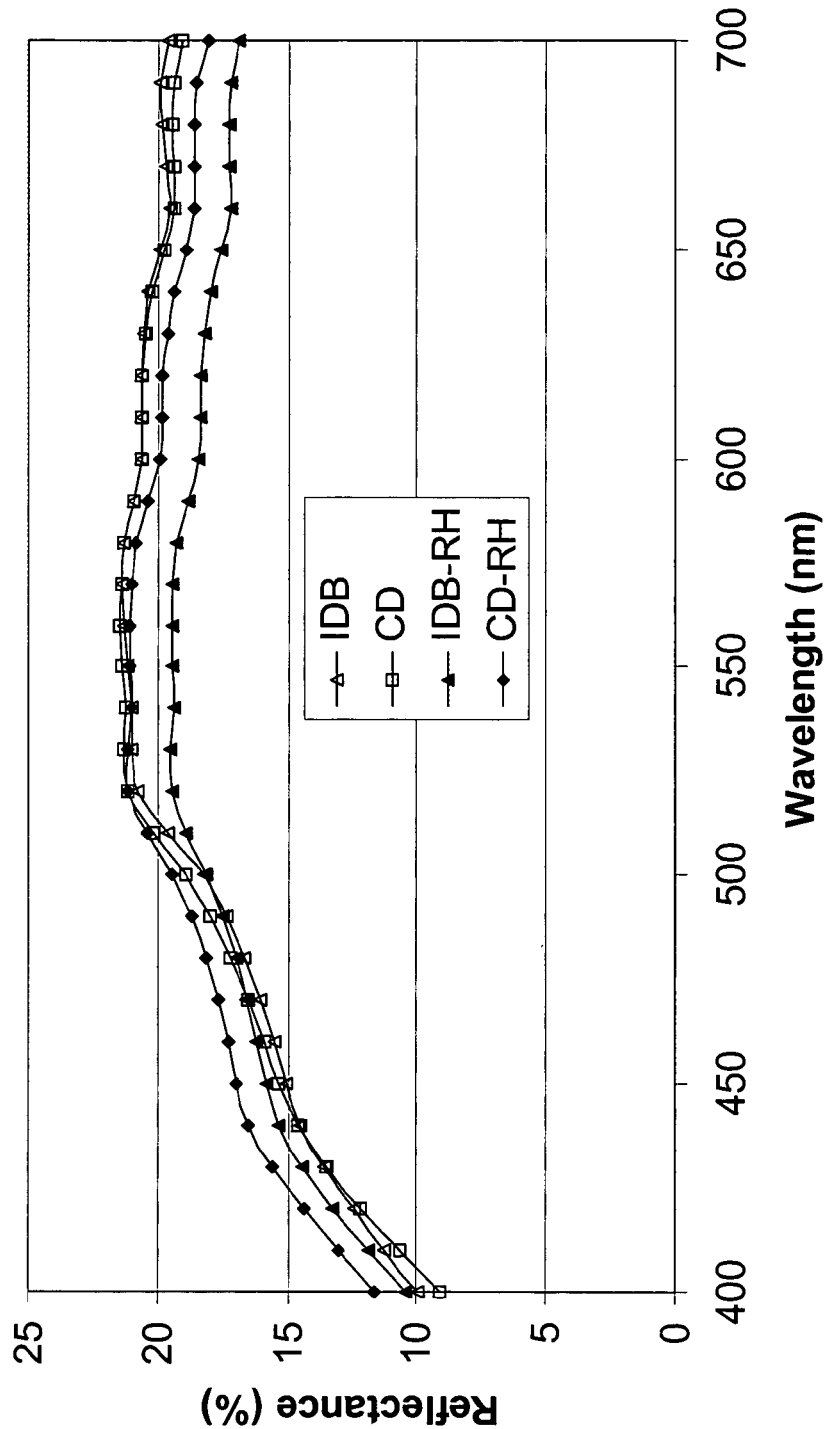

FIG. 9 shows reflectance before and after rehydration of pear samples processed with different methods. "CD" represents the conventional steam-blanched, hot air dried method. "RH" represents "rehydration."

DEFINITIONS

Blanching is the process by which heat or chemicals are used to inactivate enzymes presented in fruits, vegetables, and other foodstuffs.

Dehydration or drying is defined as using heat or other means to remove part or all of the moisture from food materials.

Processed food refers to food materials that have experienced thermal and other treatments for obtaining desired quality, appearance and other properties.

"Quality deterioration" of fruits and vegetables refers to undesired changes in color or texture, or loss of phytochemicals, nutrients, and other important food attributes.

MPa is the unit of pressure, mega Pascal. 1 MPa equals $10^6$ Pa.

Infrared radiation is electromagnetic radiation having a wavelength longer than the longest visible wavelength but shorter than those in the microwave and radio ranges. The specific wavelengths are in the range of 0.76 to 100 microns.

"Loading rate" is defined as amount of sample in the sample holder, or the area percentage of sample holder covered by the samples.

"TPA" is defined as texture profile analysis which is used to evaluate the texture properties of foods.

DETAILED DESCRIPTION OF THE INVENTION

Various enzymes are present in different fruits and vegetables. The major enzymes include peroxidase, lipoxygenase, catalase, and ascorbic acid oxidase (Dauthy, 1995). Without inactivation, these enzymes often initiate or catalyze undesirable changes in harvested foods related to color, texture and flavor. Blanching is the process by which these enzymes are inactivated.

This invention uses medium and far infrared radiation (IR) to perform blanching, dehydration/drying, and simultaneous blanching/dehydration of food, particularly in fruits and vegetables. Since this technology does not involve the addition of steam or water in the process of blanching, it has been named infrared dry-blanching (IDB) technology. IDB is intended to replace current steam, water and/or microwave blanching methods.

IR radiation effectively transfers energy (heat) and penetrates food products, driving off naturally present moisture and inactivating quality-degrading enzymes. It can be combined with heated air to accelerate the drying process and can be used to produce many kinds of convenient dried, refrigerated, frozen and dehydrofrozen products such as fruits and vegetables. IDB can also be used for dehydration and thermal processing of other commodities such as but not limited to fruit and vegetable byproducts like grape skins, orange pulp, sugar beet remnants, grains, legumes, and meat. This processing may include, but not be limited to, toasting, baking, fast cooking and drying, and a wide variety of other food processing.

IDB has much higher energy efficiency compared to steam blanching, and produces results equal to or better than steam blanching. The energy consumption of conventional food driers using hot air varies from 4 to 10 MJ/kg (1,720 to 4,300 BTU/lb) of water evaporated (Leniger and Beverloo 1975). Ginzburg (1969) reported that infrared drying could save energy up to 38% for drying a sample fruit such as apple. In other words, IDB represents a significant advance in energy efficiency, satisfying a long-felt need.

The early attempts of using infrared for blanching of celery and apples as pretreatment for freezing and peeling were reported by Asselbergs and Powrie (1956) and Asselbergs et al. (1959). However, the use of only infrared for blanching was not successful because of high expense as well as technical difficulties related to controlling the process.

Recently, new and improved infrared heaters or emitters with appropriate wavelengths have been developed, which makes the application of the technology to food and agricultural processing possible. The new and improved heaters or emitters with appropriate wavelengths provide much more control, permitting more specific and precise treatment of food and agricultural products.

Infrared radiation energy can be generated by converting thermal or electric energy to infrared radiation energy. Various infrared emitters have been developed: catalytic, electric, carbon, and ceramic. IR emitters work by transferring a large amount of thermal energy to both the surface and interior of the food product being processed. This radiation energy heats the product to a target temperature in order to achieve blanching and drying simultaneously.

Infrared radiation itself is energy in the form of a band of invisible light or electromagnetic wave. Depending on specific wavelength range, infrared energy generally is divided into the following categories: near infrared (0.8-2 μm), medium infrared (2-4 μm) and far infrared (4-100 μm). Molecular (chemical) bonds, present in all substances, evince certain physical phenomena such as vibrational and rotational frequency. IR radiation is able to excite or increase the vibrational or rotational frequency of these bonds, thereby generating heat in the product being treated.

Figure 1:
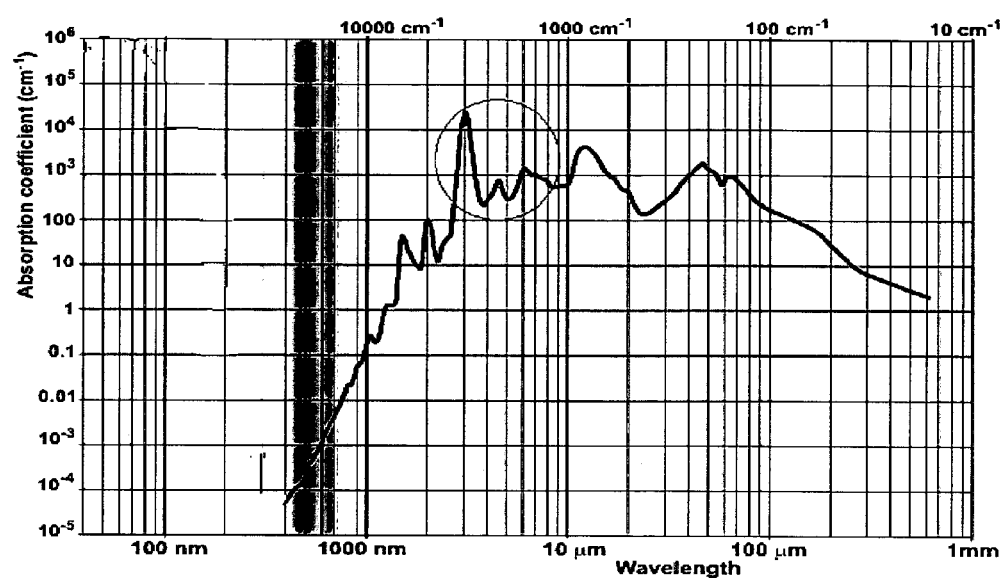
FIG. 1 shows water absorption spectrum.

The molecular bonds in water absorb energy efficiently and become heated especially when subjected to medium and far IR radiation, with peak wavelengths at 3, 4.7, and 6 microns. See FIG. 1. For wavelengths beyond 10 μm, the radiation energy is too low to be used for heating and thermal processing. This means IDB requires use of medium and far IR, at values generally below 10 μm.

Since many (most) unprocessed food products contain water, it is possible to use the IR energy spectrum that is effective at heating water in order to achieve blanching and dehydration of the food product itself. Moreover, since infrared energy in the medium and far wavelengths does not heat the air and surrounding medium, energy transfer is highly efficient. Therefore, infrared radiation can be used to blanch and reduce the moisture content of food products at faster rates without exposing them to the damage-inducing high temperatures of conventional steam or hot water blanching and convection drying.

The penetration capability or "transmissivity" of infrared depends on the physical and chemical characteristics of the products to be treated. Soft fruits and vegetables, for example, permit IR radiation to penetrate to a depth of about 10 mm (Pierce, 1998; Ginzburg, 1969). However, little information is available about the optimal design and operation conditions of infrared blanching and drying for food and agricultural products.

In the examples and experiments set forth below, effective IDB methods and operating conditions are set forth and compared to conventional blanching using hot water and steam. These examples showed in general that IDB is a superior blanching method with significantly reduced processing time and improved energy efficiency.

EXAMPLES AND EXPERIMENTS

A Catalytic flameless gas-fired (CFG) infrared emitter from Catalytic Infrared Drying Technologies LLC (Independent, Kans.) was used for these experiments. Other types of infrared emitters or heaters may also be used to generate the required medium and far infrared radiant energy. For comparison, control samples were produced by using a steam blancher and conventional heated air dryer. Various food products such as pears, baby carrots, cut sweet corn and sliced potatoes were used in these experiments to study the effectiveness of IDB.

Figure 3:
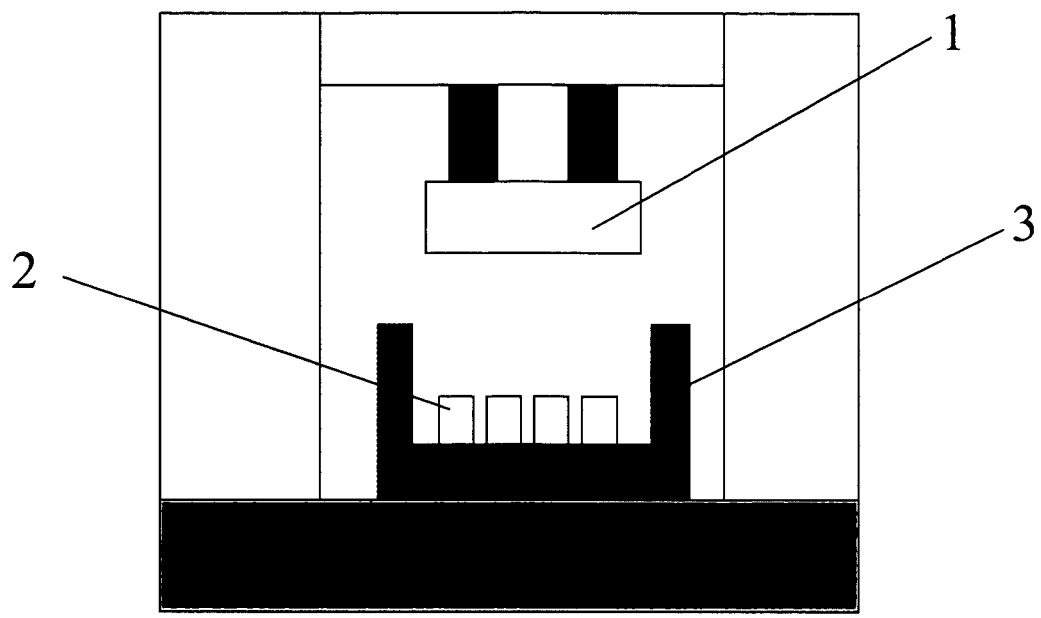
FIG. 3 shows schematic view of catalytic flameless gas-fired (CFG) infrared blancher/dryer. Number 1 in the drawing refers to the emitter itself; number 2 represents the food samples being treated; and number 3 is the sample holder.

The CFG infrared emitter used for these experiments generated medium and far IR with peak energy from 3.3 to 8 microns, utilizing catalyzed natural gas. A schematic of how the emitter was set up to function as an infrared blancher/dryer is shown in FIG. 3. When combined with air across the catalyst, natural gas reacts by oxidation-reduction to yield a controlled bandwidth of infrared energy. Small amounts of $CO_2$ and water vapor are also produced. The unique feature of this process is that the radiant energy bandwidth generated is in the medium and far infrared range with wavelengths ranging from 3.3 to 8 microns, which can be used quite effectively to target water molecules in the food products to be processed. Compared to short wavelength infrared (<2 μm) used for other applications, the relatively long wavelength used in these experiments provided the unexpected result of higher heat penetration capability.

The wavelength and total emitted energy were controlled by varying the gas supply which in turn controlled the temperature of the infrared emitter/heater. Controlling the temperature is critical—if the temperature is too low, the total emitted energy can not meet the heating requirement. If the temperature was elevated above ignition point, 600° C., the natural gas ignited, thus destroying the samples as well as causing safety concerns. To achieve desired emitter/heater temperature, the natural gas supplied to the infrared heater was measured with a flow meter at various flow rates. In order to achieve the desirable wavelength and required energy for processing fruits and vegetables, the emitter/heater was operated at a temperature of 150-600° C. (Table 1).

TABLE 1

Relationship of blackbody emitter surface temperature to peak wavelength (microns)

| 150° C. | 250° C. | 350° C. | 450° C. | 550° C. | 600° C. |
| --- | --- | --- | --- | --- | --- |
| 6.8 | 5.5 | 4.6 | 4 | 3.5 | 3.3 |

Figure 2:
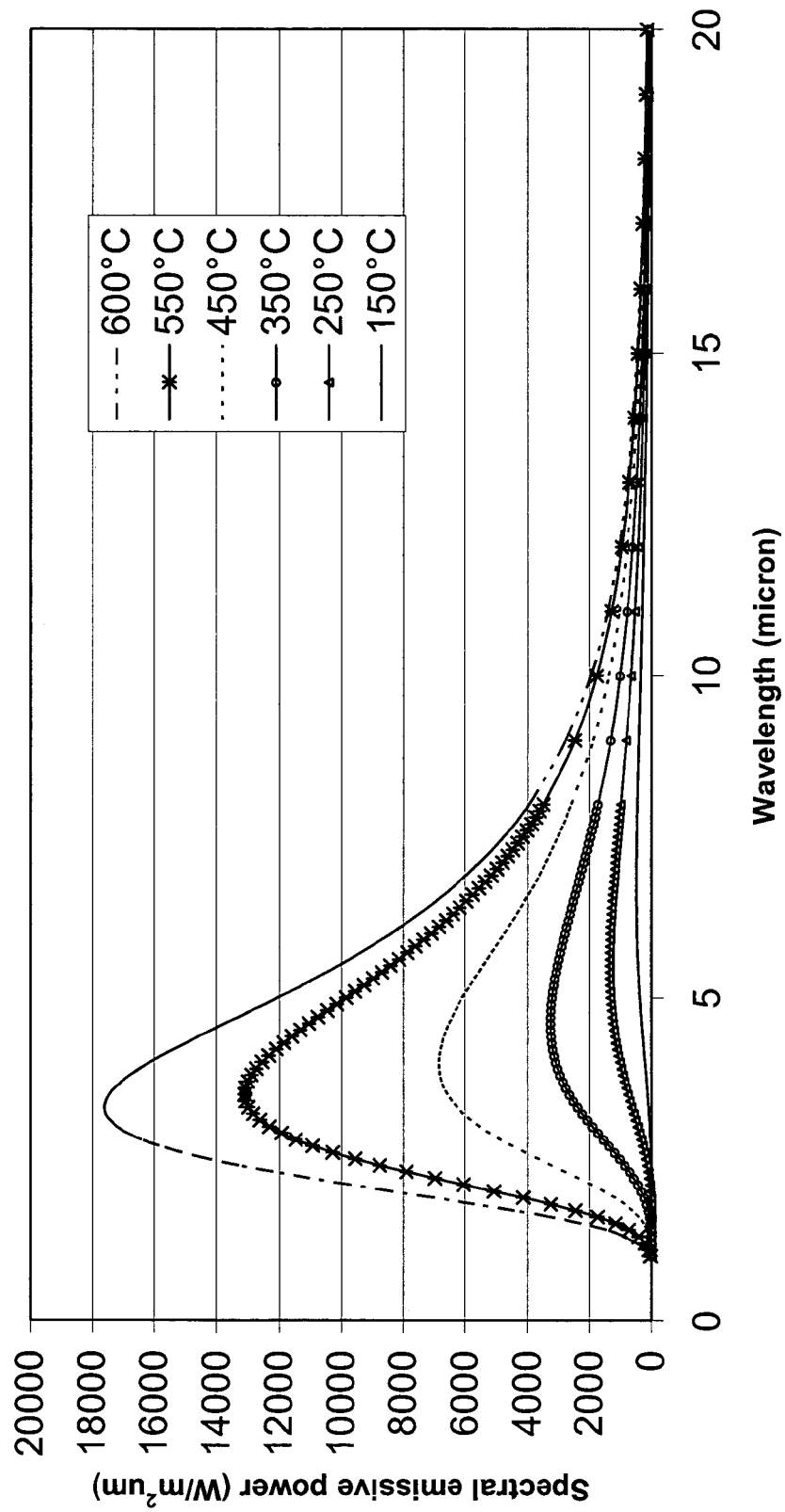
FIG. 2 shows the energy emitted at various emitter/heater surface temperatures.

The energy emitted at different emitter/heater temperatures is shown in FIG. 2.

Controlling the emitter was also achieved through use of a microcomputer linked by sensors and probes to the food products being tested. Commercially available software is available to assist this process, such as that available through Labview of National Instruments (Austin, Tex.).

Four types of fruits and vegetables, including pear, carrot, potato and sweet corn were used for blanching and dehydration tests. The samples were obtained from local food suppliers and stored in a refrigeration facility at 0-2° C. before being used in the experiments. Whole baby carrots, cut sweet corn, and sliced potatoes (French fries) were used only for the blanching experiments. Pears were used for both the blanching and dehydration tests. Sweet corn was cut from the cob before blanching which resulted in less energy being used for blanching since there was no need to heat the cob.

Blanching and drying tests were performed at various operating conditions and parameters to examine their effects on enzyme inactivation, quality degradation, processing time, and energy consumption. The sample weight changes at each processing step were also measured.

The inactivation of peroxidase is normally used as an indicator of blanching effectiveness. The presence of peroxidase was determined by use of both qualitative and quantitative methods. The two methods were described by Dauthy (1995) and Reuveni, (1992), respectively.

For qualitative determination, the processed products were cut into two pieces right after their removal from the heater/dryer. A solution of 1% guaiacol and 1% hydrogen peroxide was applied to the cut surfaces and a check for discoloration was performed after 5 min. The color of samples was compared with the control samples that were not blanched. The absence of reddish discoloration indicated that enzymes were inactivated (conversely, the presence of reddish discoloration indicated that there was still some enzymatic activity). For quantitative determination, soluble peroxidase was extracted by blending 25 g of the sample material with 75 ml water for 1 min. Then the solution was filtered through a coarse filter paper and the filtrate was mixed with 5 ml guaiacol peroxidase buffer (0.5%). The mixture was immediately poured into a cuvette and placed in a spectrophotometer to measure the absorbance at 420 nm every 30 seconds. The slope of the resulting regression line of absorption over time defined the reaction rate.

Experiment 1

Blanching Pears

Infrared Dry Blanching (IDB) was compared to conventional steam blanching. Pears were used in the first comparison. Test parameters included energy efficiency, weight reduction (through dehydration), enzyme inactivation, time needed to inactivate enzymes, and final product quality.

Recently-harvested Bartlett pears were diced into approximately half-inch cubes and all samples were dipped in ascorbic and citric acid solution with specified concentration and time periods (See experiment 3) before the blanching and dehydration, which was to prevent oxidation from occurring.

To determine a benchmark blanching time with steam, samples of pear cubes were blanched for times ranging from 30 seconds to 10 minutes with 75° C. steam. After each sample was blanched for the appointed time, it was cut into two pieces and tested for enzymatic activity, using as a control a sample that had not been subjected to blanching. In particular, each sample was examined for peroxidase activity by exposing it to a solution of 1% guaiacol and 1% hydrogen peroxide. Samples blanched for less than 5 minutes showed significant red color, which indicated that the enzymes were not completely inactivated. Therefore, minimum acceptable blanching time to achieve complete inactivation of enzymatic activity, using 75° C. steam, was determined to be 5 minutes. This was the benchmark used for later comparative tests.

Using an emitter temperature of 500° C., and a distance of 115 mm between the emitter and the sample, pear cubes were subjected to IDB treatment periods ranging from 30-120 seconds. The enzymatic activity of each sample was examined, as explained above. The results showed that enzymatic activity ceased after an IDB treatment of 2 minutes.

For blanching using infrared emitters, it was shown that the enzymes in the pear sample could be completely inactivated in approximately 2 minutes, with the product placed an optimal distance of 115 mm from the emitters which were being operated at an optimal temperature of 500° C. and which correlated to a wavelength of 3.7 μm.

The samples were tested for enzyme activity. None was found, a result which confirmed the viability of IBD and infrared blanching technologies.

The results also indicated that less time was needed to perform blanching using IDB compared to steam blanching. This was apparently due to the fact that the heating rate of IDB was higher than that of steam blanching (FIG. 4). Heating rate is defined as temperature increase per unit time, and is an indicator of how quickly heat penetrates a sample and raises its internal temperature. A higher heating rate suggests faster heat penetration.

To determine and compare the heat transfer rate, or "heating rate," of IDB and steam blanching, two different tests were conducted. The first test involved using pear cubes; the second test involved pear slices.

Pear cubes, approximately 13 mm on a side, were blanched with IDB using an emitter set at 500° C., and set at a distance of 115 mm from the samples. Pear cubes were also blanched using steam at 75° C. The heating rate of each is shown in FIG. 5. The center temperature of the samples was measured by using thermal couples placed at the geometric center of each sample. Approximately 2 minutes elapsed for the center temperatures to reach 70° C. for both IDB and steam blanching. After two minutes, the center temperature of the steam blanched sample approached an equilibrium temperature of 75° C. The temperature in the center of the sample being treated by IDB, however, continue to rise to nearly 100° C. after 4 minutes. While it is unnecessary to increase the temperature beyond 75° C. in order to achieve inactivation of enzymes, higher temperatures may be helpful if dehydration is part of the intended processing.

Pear slices, cut to a thickness of approximately 13 mm, were also tested for heat transfer rate using both IDB and steam blanching. The samples were placed in an aluminum sample holder (baking pan) inside the catalytic nameless gas-fired (CFG) infrared blancher/dryer with emitter surface temperature at 500° C. The sample holder surface was 115 mm from the emitter surface. The heating rate of pear samples with the same dimensions was also measured under steam blanching at 75° C. The samples being treated by IDB absorbed heat more quickly, showing a more rapid rise in internal temperature and therefore revealing a more efficient heat transfer rate. See FIG. 4. Since a higher heat transfer rate can result in a shorter processing time, less time is needed to inactivate enzymes using IDB compared to conventional steam blanching.

Although FIG. 4 shows that there is an inherent superiority to IDB over steam blanching in terms of time efficiency and heat transfer rate, the difference is actually greater than what is shown. The test that was conducted applied IDB heat from only one side, while steam blanching envelops a sample from all sides. If the IDB test had been performed using infrared emitters placed above or below samples, or if the samples had been placed inside a rotating drum for example, the heating rate would have undoubtedly been further increased. In other words, uniform heating from all surfaces could further reduce the time needed for blanching to inactivate the enzymes using IDB.

The experimental data also showed that a 6.7% weight reduction occurred after the 2 min IDB treatment. This weight reduction was primarily caused by moisture removal from the sample surface. If minimal moisture removal is desired during the blanching process, high loading rate or an enclosed sample chamber could be used for minimizing the water loss. The reduced moisture at the surface of the samples could also offer certain advantages to dehydrofrozen foods which are traditionally processed by first blanching then drying and finally freezing the foods.

Experiment 2

Blanching and Dehydration of Pears Using IDB

Pear samples were also subjected to a dehydration study. The conventional method of dehydrating pears is to subject them, after steam blanching, to hot, forced air in order to drive off water vapor. Since steam blanching cannot be used for dehydration processing and IDB can, IDB has a distinct advantage since it can both blanch and dehydrate in a single step.

For this experiment, fresh (wet) pear samples were dehydrated using both conventional hot air drying and IDB. Dehydration was conducted until a 50% weight reduction was achieved. The drying rates and weight losses of pears were determined using an automatic weight data acquisition system developed in the researchers' laboratory.

The temperature setting of the IDB emitter was critical to the outcome of the test. The surface temperature of heater/emitter was measured by using temperature sensors preinstalled in the emitter. The optimum conditions for achieving blanching followed by dehydration (until a 50% weight reduction of the sample was achieved) were as follows: an emitter temperature of 500° C. for the first 2 min at a distance of 115 mm from the sample (radiation energy intensity of 5.7 kW/m$^2$) between sample holder surface and emitter, followed by a temperature reduction to 470° C. and an increase in the emitter distance to 265 mm (radiation energy intensity of 2.7 kW/m$^2$).

The changes in temperature and distance combined to reduce the energy (heating) intensity during the second stage of the treatment—the dehydration stage. This reduction in heat intensity was necessary in order to avoid or minimize any deterioration of product quality in terms of texture and color development. In other words, for IDB (dehydration) applications lasting longer than 2 minutes, it might be helpful to reduce the heat supply in order to maintain both sufficient heating and also to reduce the likelihood of degrading the product.

For studying the dehydration rate of infrared processing, the sample weight change was monitored and recorded with an electronic balance and data acquisition system. The control samples were blanched with 75° C. steam for 5 min before being dried with forced heated air at velocity of 1.2 m/s and 70° C. The weight change of the samples in the heated air drying was also monitored and recorded with electric balance. The results showed that the IDB reduced the required dehydration time from 33.5 min of hot air drying to 21.6 min of IDB when 50% weight reduction was achieved (FIG. 7). This was a 35.5% time reduction or improvement of processing efficiency. Meanwhile, the IDB method combined two processing steps, blanching and dehydration, into one, but the hot air drying (conventional drying) needed an additional blanching step which would require 5 min. The total time of steam blanching and hot air drying was 38.5 min. This indicated at least 43.9% reduction of processing time by IDB compared to the existing blanching and dehydration technologies. Therefore, the improvement of processing efficiency was significant.

Energy usage was also monitored during the blanching/dehydration process. When 367 g of pear sample was blanched with IDB method for 2 min, a total of 0.014 m$^3$ of natural gas or 5,323 kJ of energy (assuming 37260 kJ/m$^3$) was used, which was obtained by measuring the gas flow rate. If the specific heat of the pear was assumed to be 3.45 kJ/kg° C., and the sample temperature was increased from 20 to 70° C., the energy used for the heating was 65.9 kJ. Therefore, the energy efficiency of IDB for blanching was 12.4%. However, the energy efficiency of commercial steam blanching was only about 3% (Bomben. 1977). Clearly, the energy efficiency of IDB was much higher than commercial steam blanching. Meanwhile, in the calculation, the energy used for dehydration was not counted. If the product needs to be dehydrated after blanching, the overall energy efficiency will be even higher. At the same time, the obtained energy was based on a small infrared blancher/dryer which has much lower energy efficiency than potential large commercial blanche/dryer. Therefore, it is concluded that IDB is an energy efficient technology for blanching and dehydration.

Assays were also conducted wherein the food product was subjected to a two-stage process. The first stage involved exposing the food item to a fixed temperature for a fixed period, followed by a second period of exposure at a different temperature. This permitted the blanching to be achieved, primarily during the first stage, and for the dehydration to occur in the second stage, generally at reduced temperature which operated to achieve the desired result but without causing unnecessary degradation to the food product.

Experiment 3

Pretreatment

It was also discovered that the blanching process can be made more effective with a "pretreatment" applied to the fruits and vegetables before IDB. In fact, without such a pretreatment, some samples turned dark before and after the blanching and dehydration process due to oxidation. This discoloration could also occur during the thawing process of dehydrofrozen samples even if the enzymes in such samples had been inactivated. Two solutions were used for the pretreatment study: 1% ascorbic acid, and a combination of 1% ascorbic acid and 1% citric acid.

To conduct this experiment, pears were cut into cubes with dimension of 12.7 mm and held in the solution for various times, from 4 to 30 min. The control sample was not dipped in the solution. Then the samples were left in the room for at least 10 min to observe the color change. It was observed that the control sample turned dark quickly, but, in general, the treated samples kept a bright color before blanching (FIG. 6). As absorbance increased, the discoloration became more noticeable.

After the dipped and control samples were blanched with 75° C. steam for 5 min and left in the room for 20 min, a color difference between the samples was noticeable. A similar color change was also observed with samples treated with IDB. Pretreatment significantly reduced this darkening which was caused by oxidation. Samples treated with 1% ascorbic acid were darker than the samples treated with a combination of 1% ascorbic acid and 1% citric acid. This was observed after the samples were exposed to air for 2.5 hr after blanching. When the sample was dipped for 30 min with the combined acid solution, the sample showed no oxidation. Therefore, it was possible to prevent oxidation by pretreating pear samples before blanching with a combined solution of 1% ascorbic acid and 1% citric acid. Based on these results, the samples used for this research were pretreated with the combined solution for 30 min before blanching.

Some fruits and vegetables, however, are not very sensitive to oxidation and may not need the pretreatment or may only need light dipping treatment (low concentration and/or short time). Carrots are an example.

Experiment 4

Texture, Color, and Nutrient Preservation

The texture of IDB blanched and dehydrated pear cubes (50% weight reduction) was measured using Instron (5500R mainframe, Merlin Software) following the Texture Profile Analysis (TPA) methods described by Brown (1977). In this test, fracturability, hardness, cohesiveness, adhesiveness, springiness, gumminess, and chewiness of the samples were determined. The control used was produced with steam blanching (75° C.) and hot air drying (70° C.). The TPA methods used two measuring cycles. The two downward cycles compressed the pear piece 60% of the entered height at a rate of 15 mm/min. The two upward cycles returned the platen to its original position at a rate of 25 mm/min. The load cell was 100N and the platen was 25 mm in diameter.

eter. The Minolta Spectrophotometer simultaneously measured the color and reflectance and then the data were downloaded into a computer. The color values of L a b were measured. The sample used for color measurement included frozen pears, frozen pears which had been thawed in the open air for 2 hours at 23° C., and those thawed in deionized water for 1 hour at 23° C. (rehydrated samples). The results of this test showed no significant difference between samples processed with IDB and steam blanching plus hot air drying.

Rehydration is important because some food applications must have high moisture content. One way to measure rehydration is to use the "rehydration ratio" which is defined as the ratio of sample weight after rehydration and before rehydration. The rehydration ratio was measured using five pieces of dehydrofrozen pears. Each pear piece was rehydrated in deionized water by placing it into a 50 mL beaker containing 20 grams of water for one hour at room temperature (23° C.). After one hour, each piece was placed on a piece of paper towel for 1 min to remove the excess water before the sample weight was determined. The test results indicated that there was no significant difference between samples processed with IDB and those processed with steam blanching and hot air drying.

Ascorbic content was used as a nutrition quality indicator in the study since it is directly related to thermal processing conditions. It was measured by following the procedure described by Loeffler and Ponting (1978). The final ascorbic content was reported based on dry solid basis. The results indicated that the samples processed with IDB had higher ascorbic content than those processed with steam blanching and hot air drying.

The typical TPA curve of blanched and dehydrated pear is shown in FIG. 8. The detailed definitions and calculation methods for fracturability, hardness, energy area, cohesiveness, adhesiveness, springiness, gumminess and chewiness were adopted from Bourne (1978). From the texture measurement results, it was apparent that the sample processed with IDB was firmer than the samples processed with steam and hot air (See table 2 below). This was also observed with sensory evaluation during the experiment. The samples processed with IDB tended to have cleaner flavor compared to traditional methods. The texture results indicated that IDB technology produced products with superior texture compared to those produced by existing technology.

TABLE 2

Texture characteristics of pear processed with IDB and conventional method

| Sample Name | Sample # | Fracturability (N) | Hardness $1^{st}$ peak (N) | Energy (MJ) area of $1^{st}$ peak | Hardness $2^{nd}$ Peak (N) | Energy (MJ) area of $2^{nd}$ peak | Cohesiveness (ratio) | Adhesiveness (MJ) | Springiness (mm) | Gumminess (N) | Chewiness (N) |
|---|---|---|---|---|---|---|---|---|---|---|---|
| IBD | Average | 18.3 | 18.3 | 20.7 | 12.6 | 4.1 | 0.20 | 0.41 | 1.55 | 3.73 | 5.76 |
|  | S.D. | 7.7 | 7.6 | 8.9 | 5.0 | 1.6 | 0.02 | 0.18 | 0.09 | 1.57 | 2.42 |
|  | High | 33.9 | 33.9 | 39.9 | 22.5 | 7.3 | 0.24 | 0.75 | 1.69 | 6.23 | 9.63 |
|  | Low | 9.6 | 9.6 | 10.1 | 6.8 | 2.1 | 0.16 | 0.24 | 1.45 | 2.01 | 3.11 |
|  | Range | 24.3 | 24.3 | 29.8 | 15.7 | 5.2 | 0.08 | 0.51 | 0.25 | 4.23 | 6.53 |
| CD | Average | 13.1 | 13.1 | 14.2 | 9.0 | 3.2 | 0.23 | 0.38 | 1.68 | 2.91 | 4.83 |
|  | S.D. | 4.8 | 4.8 | 5.8 | 3.1 | 0.9 | 0.03 | 0.14 | 0.20 | 0.73 | 0.94 |
|  | High | 24.9 | 24.9 | 29.3 | 17.0 | 5.4 | 0.28 | 0.60 | 2.10 | 4.61 | 6.91 |
|  | Low | 8.5 | 8.5 | 8.9 | 6.2 | 2.3 | 0.19 | 0.21 | 1.48 | 2.06 | 3.70 |
|  | Range | 16.4 | 16.4 | 20.4 | 10.8 | 3.1 | 0.10 | 0.39 | 0.63 | 2.55 | 3.20 |

The results of this test showed that samples produced with IDB tended to have higher firmness than the control.

The color and reflectance of blanched and dehydrated pear pieces were measured using a Minolta Spectrophotom- The color changes of pear samples processed with IBD and those processed by the conventional method of steam blanching and hot air drying are shown in Table 3 below. In general, no significant difference between blanched and dehydrated samples processed with different methods was observed even though it seemed that samples darkened slightly during thawing and rehydration based on the color data. After the blanched and dehydrated pear samples were rehydrated and thawed, however, the product appeared to become brighter due to the increased translucence as indicated by the lowered reflectance (FIG. 9). When the hydration ratios of pear samples processed with IDB and conventional methods were examined, no significant difference was found.

Potatoes were also subjected to IDB. Rectangular potato samples (like French fries) with a cross section of 12.7×12.7 mm were blanched. Enzyme inactivity was achieved within 3.5 minutes. If a golden-brown color is desired, the sample can be kept in the blancher slightly longer. This process also showed that low fat French fries could be produced with IDB technology, offering important nutritional benefits.

TABLE 3

Color change of pear samples processed with different methods

| Samples | Frozen | | | Thawed | | | Rehydrated | | |
|---|---|---|---|---|---|---|---|---|---|
| | L | a | b | L | a | b | L | a | b |
| IDB | 56.5 ± 2.4 | −3.8 ± 0.4 | 12.0 ± 1.6 | 54.3 ± 1.1 | −4.7 ± 0.4 | 11.1 ± 1.6 | 50.6 ± 3.9 | −3.9 ± 0.2 | 5.9 ± 0.9 |
| CD | 54.1 ± 2.9 | −4.4 ± 0.3 | 11.9 ± 3.1 | 52.6 ± 1.5 | −5.0 ± 0.4 | 11.2 ± 2.2 | 52.3 ± 2.4 | −4.4 ± 0.2 | 7.0 ± 0.7 |

Ascorbic content was used as a nutritional quality indicator. Samples were dipped and held in an ascorbic solution for 30 minutes and then measured for their ascorbic acid content. The samples were then subjected to IDB for two minutes, followed by another check for ascorbic content. It appeared that partially dehydrated products produced with IDB had higher ascorbic content compared to that produced with steam blanching and hot air drying (see table 4 below). Therefore, nutrient retention is another advantage of IDB compared to conventional steam blanching.

TABLE 4

Ascorbic content of samples various pear samples

| Samples | mg/g |
|---|---|
| Fresh cut | 0.3 ± 0.1 |
| 30 min dip | 15.0 ± 0.5 |
| Steam blanched | 9.9 ± 0.6 |
| IR blanched (2 min) | 14.8 ± 0.3 |
| 50% weight reduction with steam and hot air | 12.1 ± 1.6 |
| 50% weight reduction with IR | 13.5 ± 1.9 |

Experiment 5

Effectiveness of IDB for Blanching Apples, Carrots, Sweet Corn and Potatoes

The effectiveness of IDB for carrots, sweet corn and potatoes was studied with an emitter set at 500° C. and placed a distance of 115 mm from the sample holder surfaces. The enzymatic activity of processed samples was determined with qualitative methods as described before.

For baby carrot blanching, carrots with a diameter of approximately 15 mm were used. The results showed complete enzyme inactivation after 3-4 minutes of blanching and that the carrots had a very nice appearance and texture.

With the same heating conditions as used for carrots, cut sweet corn kernels were blanched for one minute and achieved complete enzyme inactivation. Since the cob of sweet corn is not heated during the IDB process, less energy is consumed compared to current steam blanching technology. The obvious effectiveness of the IDB technology for blanching carrot and sweet corn showed that IDB technology would be an excellent replacement for standard hot water/steam blanching.

REFERENCES

Afzel, T. M. and Abe, T. 1997. Modeling far infrared drying of rough rice. Journal of Microwave Power and Electromagnetic Energy. 32:80-86.

Aminov, M. S., Dibirov, A. M., and Azizov, G. G. 1976. The effect of preliminary fruit treatment method on the quality of compotes. Konservnaya-i-Ovoshchesushil'naya-Promyshlennost. p 20-21.

Asselbergs, E. A., and W. P. Powrie. 1956. The peeling of apples with infrared radiation. *Food Technology*, 10:297.

Asselbergs, E. A., W. P. Mohr, J. G. Kemp, and A. R. Yates. 1959. Blanching of celery and apples by infrared shows flavor, texture, and appearance gains. *Quick Frozen Foods*. 21:45.

Association of Official Analytical Chemists. 1990. Official Methods of Analysis, 15th ed. AOAC, Arlington, Va.

Avisse, C. and Varoquaux, P. 1977. Microwave blanching of peaches. Journal-of-Microwave-Power. 12(1):73-77.

Brown, M. S. 1977. Texture and frozen fruits and vegetables. Journal of Texture Studies. 7:391-404.

Cano, M. P., Lobo, M. G. and Ancos, B-de. 1998. Peroxidase and polyphenol oxidase in long-term frozen stored papaya slices. Differences among hermaphrodite and female papaya fruits. Journal-of-the-Science-of-Food-and-Agriculture. 76(1):135-141.

Catalytic Drying Technologies LLC. 2003. Equipment specifications. Web site www.catalyticdrying.com accessed in January 2003.

Dauthy, M. E. 1995. Fruit and vegetable processing. FAO Agricultrual Services Bulletin No. 119.

Devece, C., Rodriguez-Lopez, J. N., Fenoll, L. G., Tudela, J. Catala, J. M., Reyes, E-de-los. and Garcia-Canovas, F. 1999. Enzyme inactivation analysis for industrial blanching applications: comparison of microwave, conventional, and combination heat treatments on mushroom polyphenoloxidase activity. Journal-of-Agricultural-and-Food-Chemistry. 47(11): 4506-4511.

Dietrich, W. C., Huxsoll, C. C., Wagner, J. R. and Guadagni, D. C. 1970. Comparison of microwave with steam or water blanching of corn-on-the-cob. II. Peroxidase inactivation and flavour retention. Food-Technology. 24(3): 293-96.

Dominguez, R., Quintero, A., Bourne, M. C., Talamas, R., and Anzaldua-Morales, A. 1996. Texture of dehydrated bell peppers modified by low-temperature blanching and calcium addition. IFT annual meeting: book of abstracts, p. 88-89 ISSN 1082-1236.

FMC. 2003. Blanching and dehydration technology. Food Manufacturing Coalition http://foodsci.unl.edu/fmc/need-15.htm.

Fuchigami, M., Miyazaki, K., and Hyakumoto, N. 1995. Frozen carrots texture and pectic components as affected by low-temperature-blanching and quick freezing. Journal-of-Food-Science. 60(1): 132-136.

Ginzburg, A. S. 1969. Application of infrared radiation in food processing. London.

Günes, B. and Bayindirli, A. 1993. Peroxidase and Lipoxygenase Inactivation During Blanching of Green Beans, Green Peas and Carrots, Lebensmittel-Wissenschaft und-Technologie. 26(5):406-410.

Hebbar, H. U. and Rastogi. N. K. 2001. Mass transfer during infrared drying of cashew kernel. Journal of Food Engineering. 47:1-5.

Huxsoll, C. C., Dietrich, W. C. and Morgan, A. I. 1970, Comparison of microwave with steam or water blanching of corn-on-the-cob, Food Technology, Vol. 24, p 290.

Johanson, R. W., Davis, R. A., Macaluso, V. J. and Phillippi, J. J. 1999. Agitated bed infrared drying apparatus. U.S. Pat. No. 5,893,217.

Leniger, H. A. and Beverloo, W. A. 1975. Food process engineering. Dordrecht, Holland, D. Reidel Publisher. Co. p 552.

Matser, A. A., Knott, E. R., Teunissen, P. G. M. and Bartels, P. V. 2000, Effects of high isostatic pressure on mushrooms, Journal of Food Engineering, 45(1):11-16.

Mongpraneet, S., Abe, T. and Tsurusaki, T. 2002. Far infrared-vacuum and -convection drying of welsh onion. Transaction of ASAE. 45(5):1529-1535.

Nindo, C. I., Kudo, Y. and Bekki, E. 1995. Test model for studying sun drying of rough rice using far-infrared radiation. Drying Technology. 13:225-238.

Paakkonen, K. 1999. Infrared drying of herbs. Agricultural and Food Science in Finland. 8:19-27.

Pan, Z., Santos, M. R. and Thompson, J. F. 2003. Application of infrared technology in rough rice drying. Presentation at ASAE Annual International Meeting. Jul. 27-30, 2003. Las Vegas, Nev.

Pierce, B. N. 1998. Method of thermally and selectively separating water and solvents from solids under vacuum utilizing radiant heat. U.S. Pat. No. 5,820,820.

Quaglia, G. B., Gravina, R., Paperi, R. and Paoletti, F. 1996, Effect of high pressure treatments on peroxidase activity, ascorbic acid content and texture in green peas, Lebensmittel-Wissenschaft und-Technologie, 29(5-6):552-555.

Rao, P. N. 1983. Effectiveness of infrared radiation as a source of energy for paddy drying. Journal of Ag. Eng. XX (2):71-76.

Reuveni, R., Shimoni, M., Karchi, Z. and Kuc, J. 1992. Peroxidase activity as a biochemical maker for resistance of muskmelon (*cucumis melo*) to pseudoperonospors cubensis. The American Phytopathological Society. 82(7):649-753.

Seyed-Yagoobi, J. and Wirtz. J. W. 2001. An experimental study of gas-fired infrared drying of paper. Drying Technology. 19(6):1099-1112.

Stanley, D. W., Bourne, M. C., Stone, A. P., Wismer, W. V. 1995. Low temperature blanching effects on chemistry, firmness and structure of canned green beans and carrots Journal-of-Food-Science. 60(2): 327-333.

Sundu, C. 1986. Infrared radiative drying in food engineering: a process analysis. Biotechnology progress. 2(3):109-119.

Thomas, D. J., Parkin, K. L. and Simon, P. W. 1992. Development of a simple pungency indicator test for onions. J. Sci. food Agric. 60:499-504.

Thompson, J. F., Rumsey, T. R. and Singh, R. P. 1981. Potential of recycling air in an industrial cross-flow rice dryer. ASAE Paper 81-6514. American Society of Agricultural Engineers. St. Joseph, Mich.

Torreggiani, D., Lucas, T. and Raoult-Wack, A. L. 2002. The pre-treatment of fruits and vegetables. In; fruit and vegetable processing, W. Jongen (ed.). Woodhead Publishing Limited. London, UK.

USDA. 2003. Agricultural Statistics. United States Department of Agriculture. Washington D.C.

Vanlaanen, P. 2003. Freezing fruits and vegetables. Texas Agricultural Extension Service. L-2215.

What is claimed is:

1. A method for simultaneously blanching and dehydrating a fruit or vegetable, the method comprising:
   a. providing an adjustable-temperature flameless gas-fired infrared radiation emitter operated in a temperature range of between 150° C. to 600° C.;
   b. exposing the fruit or vegetable to the radiation for 2 to 4 minutes, such that the internal temperature of the fruit or vegetable reaches 70° C. to 100° C. within about 2 minutes;
   thereby simultaneously blanching and dehydrating the fruit or vegetable.

2. The method of claim 1, wherein the emitter is operated at infrared wavelengths in the range of 3-8 microns.

3. The method of claim 1, wherein the emitter is operated for a first period at a fixed temperature, followed by a second period wherein the emitter is operated at a different fixed temperature.

4. The method of claim 1, further comprising exposing the fruit or vegetable to forced hot air.

5. The method of claim 1, further comprising exposing the fruit or vegetable to vacuum conditions.

6. The method of claim 1, which results in at least about a 6.7% reduction in weight of the fruit or vegetable.

7. The method of claim 1, which results in about a 50% reduction in weight of the fruit or vegetable.

* * * * *